Aug. 30, 1932.  C. JOHNSON  1,874,704
FLUID PRESSURE RESPONSIVE DEVICE
Filed Jan. 19, 1931
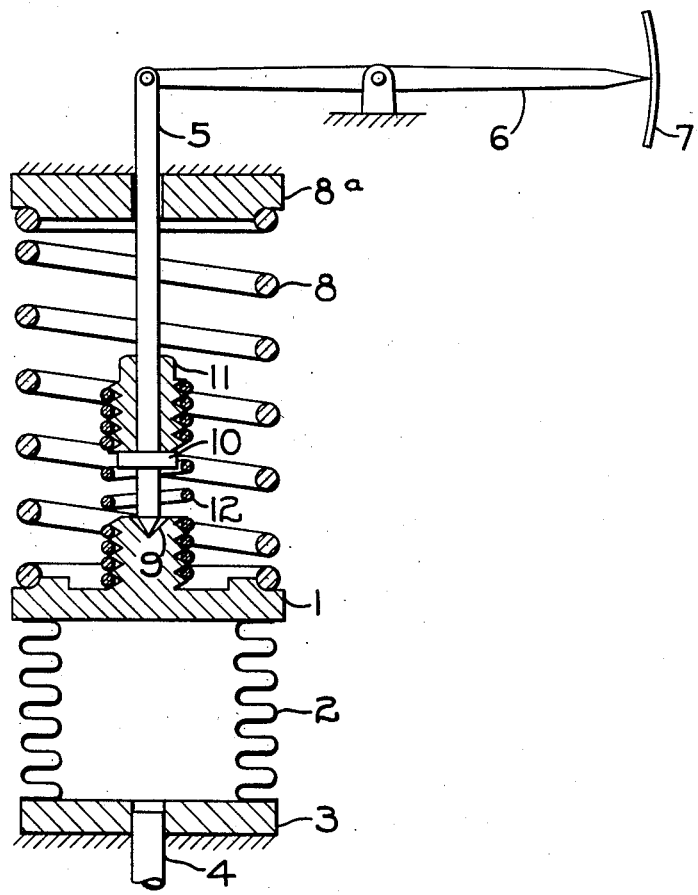
INVENTOR
Clarence Johnson,
BY
ATTORNEY Patented Aug. 30, 1932

1,874,704

UNITED STATES PATENT OFFICE

CLARENCE JOHNSON, OF CLEVELAND, OHIO, ASSIGNOR TO BAILEY METER COMPANY, A CORPORATION OF DELAWARE

FLUID PRESSURE RESPONSIVE DEVICE

Application filed January 19, 1931. Serial No. 509,867.

This invention relates to fluid pressure responsive devices such as pistons, diaphragms, bellows and the like, and particularly to the indication of the fluid pressure through a measure of the movement of the abutment against which such pressure is applied.

The object of the invention is to provide an improved transmission of the position, or change in position, of the abutment to a member desirably positioned in accordance with variations in the pressure, and for a consideration of what I believe to be novel and my invention, attention is directed to the accompanying description and the claims appended thereto.

In the drawing, the figure is a vertical, sectional view of a construction embodying my invention.

Referring to the drawing, 1 indicates a movable abutment, here shown in the form of a head to a flexible metal bellows 2, closed at the opposite end by a fixed wall 3. Fluid pressure effective upon the movable abutment 1 is supplied through a pipe 4, and may be from any source (not shown). Movement of the abutment 1 is transmitted by a member 5 to a fulcrumed beam 6 cooperating with an index 7, and in the present instance is shown as opposed by a coil spring 8, fixed at one end against a wall 8a.

My invention relates particularly to the connection between the movable abutment 1 and the member 5.

According to my invention I connect the movable abutment to the member in such a manner as to provide a yieldable universal connection. By this means misalignment may occur between the direction of motion of the abutment 1 and that of the member 5, without impairing the accuracy of transmission of position of the abutment, and I may readily vary the amount of force tending to hold the abutment and the member in engagement and still allow the universal connection to yield from misalignment or other cause.

Referring now particularly to the embodiment of the invention illustrated in the drawing, the abutment 1 has a conical seat 9 formed thereon, and the lower end of the member 5 is pointed, to cooperate in the seat 9. The member 5 is provided with a fixed collar 10 a relatively short distance above the pointed end, and upon this collar rests a nut 11, loosely fitted to the member 5 and for a portion of its length is threaded externally. Similarly threaded, is a portion of the abutment 1, surrounding the seat 9, and over these threads is turned a coil spring 12, certain turns of the coil spanning the space between the uppermost thread around the seat 9 and the lowermost thread of the nut 11.

By having the nut 11 loosely fitted to the member 5 and resting on the collar 10, I am able to increase or decrease the tension as well as the stiffness of the coil spring 12 across the space between the threaded sections, by turning the nut 11 and correspondingly threading more or less of the coil onto the threaded portion of the nut. By this means I vary the force of contact of the member 5 in the seat 9, while maintaining a universal connection between the member 5 and the abutment 1 so that the two need not be aligned. Also if for some reason the point or end of the member 5 is pulled away from the seat 9, then the restoring force of the spring 12 not only tends to carry the end back in contact with the seat 9, but at the same time causes a direct or centering contact, so that the point of contact is always the same. As a result the position of the abutment 1 is readily and accurately transmitted to the member 5 with a minimum of friction or other difficulties resulting from misalignment.

Having now described the principle of operation of my invention, together with the apparatus which I now consider to represent the best embodiment thereof, I desire to have it understood that the apparatus shown is only illustrative, and that the invention may be carried out by other means.

What I claim as new and desire to secure by Letters Patent of the United States, is:

1. In combination, a movable abutment to which fluid pressure is applied to effect movement thereof, a yielding means which opposes such movement, a member which engages and is positioned by said abutment, means joining said member to said abutment comprising a yieldable universal connection, and means for adjusting the yieldability of said universal connection.

2. In combination, a movable abutment to which fluid pressure is applied to effect movement thereof, said abutment having a seat formed thereon, a yielding means which opposes such movement, a member which engages said seat and is positioned by said abutment, means holding said member on said seat comprising a spring, and means for varying the tension of said spring.

3. In combination, a movable abutment to which fluid pressure is applied to effect movement thereof, said abutment having a seat formed thereon, a yielding means which opposes such movement, a member which engages said seat and is positioned by said abutment, means holding said member on said seat comprising a coiled spring, said spring surrounding the point of contact between said member and said seat, and means for varying the tension of said spring.

4. In combination, a movable abutment to which fluid pressure is applied to effect movement thereof, said abutment having a seat formed thereon, a yielding means which opposes such movement, a member which engages said seat and is positioned by said abutment, a yieldable universal connection holding said member on said seat, and means for adjusting the yieldability of said universal connection.

5. In combination, a movable abutment to which fluid pressure is applied to effect movement thereof, said abutment having a conical seat formed thereon, a yielding means which opposes such movement, a member having a pointed end which engages said seat, said member positioned by said abutment, a yieldable universal connection holding the pointed end of said member in engagement with said seat, and means for adjusting the yieldability of said universal connection.

6. In combination, a movable abutment to which fluid pressure is applied to effect movement thereof, a yielding means which opposes such movement, a member which engages and is positioned by said abutment, a yieldable universal connection holding said member in engagement with said abutment comprising a spring, and means for varying the tension of said spring.

7. In combination, a movable member to which a force is applied to effect movement thereof, said movable member having a seat formed thereon, a yielding means which opposes such movement, a second member which engages the seat and is positioned by said movable member, means holding said second member on said seat comprising a spring, and means for varying the tension of said spring.

8. In combination, a movable member to which a force is applied to effect movement thereof, said movable member having a seat formed thereon, a yielding means which opposes such movement, a second member which engages said seat and is positioned by said movable member, means holding said second member on said seat comprising a coiled spring, said spring surrounding the point of contact between said second member and said seat, and means for varying the tension of said spring.

In witness whereof, I have hereunto set my hand this 22nd day of December, 1930.

CLARENCE JOHNSON.